(12) United States Patent
Kumar et al.

(10) Patent No.: US 9,661,652 B2
(45) Date of Patent: May 23, 2017

(54) EFFICIENT RECEIVER YIELDING FOR DISTRIBUTED D2D COMMUNICATIONS

(71) Applicant: Intel IP Corporation, Santa Clara, CA (US)

(72) Inventors: Utsaw Kumar, Santa Clara, CA (US); Qinghua Li, San Ramon, CA (US); Pingping Zong, Randolph, NJ (US)

(73) Assignee: Intel IP Corporation, Santa Clara, CA (US)

( * ) Notice: Subject to any disclaimer, the term of this patent is extended or adjusted under 35 U.S.C. 154(b) by 166 days.

(21) Appl. No.: 14/496,842

(22) Filed: Sep. 25, 2014

(65) Prior Publication Data

US 2015/0215088 A1    Jul. 30, 2015

Related U.S. Application Data

(60) Provisional application No. 61/933,852, filed on Jan. 30, 2014.

(51) Int. Cl.
| | |
|---|---|
| *H04L 5/00* | (2006.01) |
| *H04W 24/08* | (2009.01) |
| *H04W 72/02* | (2009.01) |
| *H04W 72/10* | (2009.01) |
| *H04W 72/14* | (2009.01) |
| *H04W 72/12* | (2009.01) |
| *H04W 56/00* | (2009.01) |

(52) U.S. Cl.
CPC ............ *H04W 72/14* (2013.01); *H04L 5/006* (2013.01); *H04W 56/002* (2013.01); *H04W 72/1226* (2013.01)

(58) Field of Classification Search
CPC .... H04L 5/0032; H04L 5/0007; H04W 72/14; H04W 56/002; H04W 72/1226; H04W 48/06; H04W 48/08; H04W 48/10; H04W 48/14; H04W 74/08; H04W 74/0808; H04W 74/0816; H04W 74/0875
USPC .......................................................... 370/252
See application file for complete search history.

(56) References Cited

U.S. PATENT DOCUMENTS

| | | | | |
|---|---|---|---|---|
| 8,861,418 B2* | 10/2014 | Wu | ........ | H04W 8/186 370/312 |
| 2009/0111506 A1* | 4/2009 | Laroia | ............ | H04W 28/22 455/550.1 |
| 2012/0147823 A1* | 6/2012 | Patil | ............. | H04W 76/023 370/329 |
| 2014/0295858 A1* | 10/2014 | Li | .............. | H04W 74/08 455/450 |
| 2015/0327296 A1* | 11/2015 | Kumar | ............ | H04W 72/14 370/329 |

* cited by examiner

*Primary Examiner* — Mark Rinehart
*Assistant Examiner* — Kenneth P Hunt
(74) *Attorney, Agent, or Firm* — Schwegman Lundberg & Woessner, P.A.

(57) ABSTRACT

A distributed scheduling scheme for D2D communications is described in which D2D transmitter terminals send transmit requests and D2D receiver terminals respond with bandwidth grant messages if certain interference criteria are met. The described scheme may include a technique for more efficiently scheduling D2D links by having D2D receivers base their decisions as to whether to send a bandwidth grant message on whether or not a higher priority D2D receiver has transmitted a bandwidth grant message.

16 Claims, 3 Drawing Sheets

EFFICIENT RECEIVER YIELDING FOR DISTRIBUTED D2D COMMUNICATIONS

PRIORITY CLAIM

This application claims the benefit of priority under 35 U.S.C. 119(e) to U.S. Provisional Patent Application Ser. No. 61/933,852, filed Jan. 30, 2014, which is incorporated herein by reference in its entirety

BACKGROUND

Device-to-device (D2D) communications is one means for improving the performance of LTE (Long Term Evolution) and other cellular networks. In D2D communications, terminals (referred to as user equipments or UEs in LTE) communicate with one another directly rather than being linked through the base station (referred to as an evolved node B or eNB in LTE). D2D communications is a powerful way to increase spatial reuse of resources in cellular systems for higher throughput.

D2D (device-to-device) communications can increase data rates and system capacity by enabling direct communication between mobile stations. Various proximity-based applications and services can be enabled with D2D. D2D communications is expected to play a vital role in next generation communication systems, including public safety applications. With the increasing density of users, the problem of scheduling and interference management is quite challenging. The problem becomes even more challenging in the absence of a centralized entity managing contention and scheduling. For example, when an earthquake occurs, nearby base stations may not work, and D2D devices need to contend for transmissions themselves. Accordingly, schemes for distributed scheduling have been put forth. These schemes generally involve transmission requests being sent multiple times over multiple iterations for scheduling parallel D2D links sharing the same channel with high spatial reuse. Improving the performance of such distributed scheduling schemes for D2D communications is a concern of the present disclosure.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
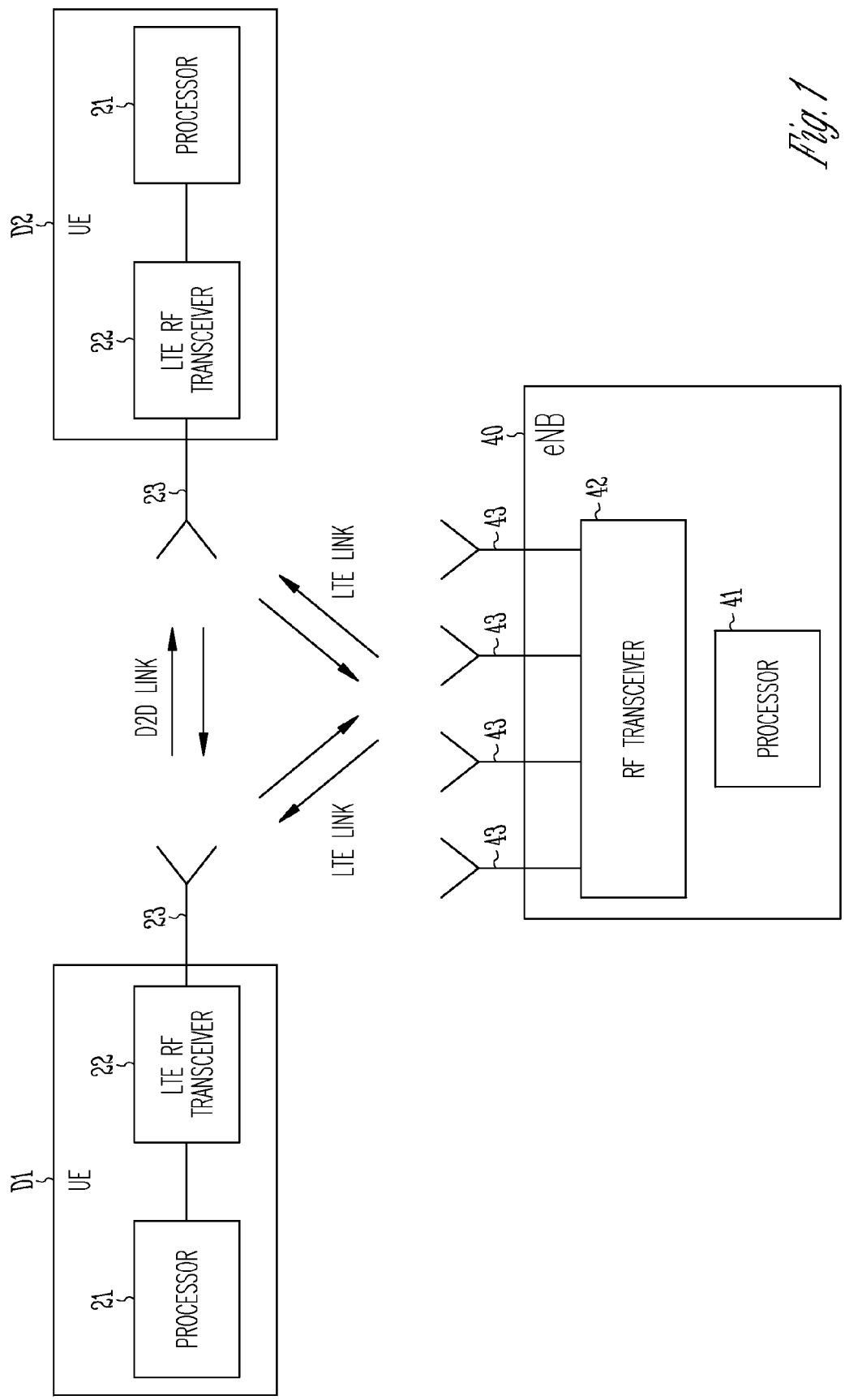
FIG. 1 shows example UE devices for D2D communications in accordance with some embodiments.

In the descriptions that follow, terminals may be referred to as UEs regardless of whether such terminals are actually part of an LTE network. FIG. 1 shows an example of a UE D1 and a UE D2 in accordance with some embodiments. Each of the UEs incorporates a processor 21 interfaced to radio-frequency (RF) transceiving circuitry 22 that is connected to one or more antennas 23. A base station or eNB 40 is shown with a processor 41 interfaced to RF transceiving circuitry 42 that is connected to a plurality of antennas 43. The illustrated components are intended to represent any type of hardware/software configuration for providing air interfaces for both LTE and D2D communication and for performing the processing functions as described herein. In the embodiment shown in the figure, UEs D1 and D2 both communicate with the eNB 40 via LTE links and with one another via a D2D link.

In a centralized D2D scheduling scheme, UEs such as D1 and D2 are assigned wireless channel resources for D2D communications by a base station such as eNB 40 in FIG. 1. In a distributed scheduling scheme, on the other hand, the terminals accomplish the scheduling by communicating transmission requests and bandwidth grant messages between themselves and by implementing rules for deciding whether a particular D2D link should be scheduled. In a distributed scheduling scheme, the terminals may acquire time and frequency synchronization for communication from an infrastructure node such as an eNB or from another external source such as the global positioning system (GPS).

In an example distributed scheduling scheme, all the D2D links in a network are given unique priorities. The links are prioritized such that a high priority link can acquire the channel before the low priority ones. All the transmitters with data to send broadcast a transmit request with link optimized power. Based on the received signal strengths from various transmitters, a receiver makes a decision as to whether to send a bandwidth grant message to its transmitter (i.e., bandwidth is granted if the signal-to-interference ratio (SIR) is above a certain threshold). If the SIR constraint is not satisfied, the receiver of an unscheduled D2D link does not grant the channel to its transmitter because it finds that the link to itself from its own transmitter is severely interfered with by a higher priority link (even though that particular link may or may not get scheduled eventually). This decision to not grant the channel by the receiver is also called receiver yielding (or, simply Rx-yield). A yielding receiver has no way of knowing if the higher priority link it is yielding to is getting scheduled or is itself yielding to another higher priority link. In one embodiment, the receiver takes a conservative approach so that the receiver always yields if it hears a transmit request from a higher priority transmitter and the corresponding SIR does not satisfy the yielding constraint. As the D2D link density increases, the number of transmit requests is much higher than the number of links that eventually get scheduled. Since most of the transmit requests may not be accepted, the yielding criteria mentioned above can be very conservative. For example, for sufficiently high link density, say 15-20 D2D links per cell or higher, more than two-thirds of the transmit requests may be rejected. Thus, yielding to such eventually unscheduled links at the cost of losing transmission opportunities is a suboptimal approach.

Figure 2:
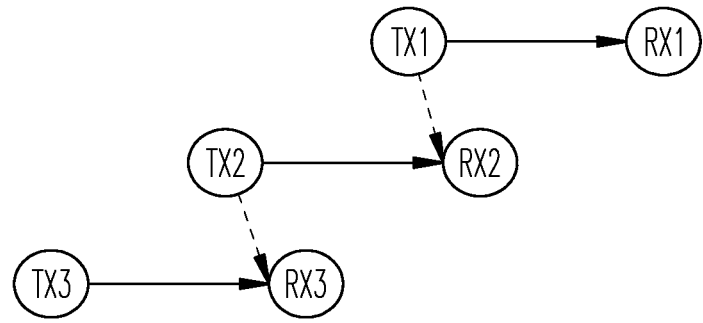
FIG. 2 shows an example of receiver yielding in a distributed scheduling scheme accordance with some embodiments.

Consider the case illustrated in FIG. 2 showing, in accordance with some embodiments, three D2D transmitters Tx1 through Tx3 and three D2D receivers Rx1 through Rx3. The D2D pairs Tx1-Rx1, Tx2-Rx2, Tx3-Rx3 communicate via D2D links 1 through 3, respectively. The transmitters send transmission requests in a defined time slot. The transmission priorities from high to low are link 1, 2, and 3. Thus, Rx2 should yield to link 1 if Tx1 transmits a transmission request and the SIR constraint is not satisfied. Similarly, Rx3 should yield to link 1 if Tx1 transmits a transmission request and its corresponding SIR constraint is not satisfied, and should also yield to link 2 if Tx2 transmits a transmission request and the SIR constraint is not satisfied. Link 1 has the highest priority and is always scheduled if Tx1 sends a transmission request. By measuring the power in the transmission request from Tx1, Rx2 knows how much interference Tx1 will cause. In this case, Rx2 is close to Tx1 and suffers from high interference from Tx1. Thus, Rx2 decides to yield to the higher priority link 1. At the same time, Rx3 is close to Tx2 and suffers from high interference from Tx2. Thus, Rx3 yields as well. However, since Rx2 is also yielding, link 2 is not getting scheduled and thus Rx3 does not need to yield. The optimal scheduling in this case would be when both links 1 and 3 are scheduled.

In an embodiment to improve this situation, use is made of the fact that the bandwidth grant message is broadcasted. A receiver that is yielding to a higher priority link checks if it can listen to and decode the bandwidth grant message of the higher priority receiver it is yielding to. If it cannot hear the grant message of the higher priority link, it assumes that, that particular link was not scheduled and grants its own transmitter. Thus, if there is no higher priority link getting scheduled or if the interference from a granted higher priority link is tolerable, the receiver grants the channel to its transmitter. This approach leads to a improvement in cell average throughput. In one embodiment, the bandwidth grant message is done at full power rather than link optimized power as in some previous schemes. In general, the bandwidth grant message by a receiver can be sent at any power level that is high enough to notify nearby unscheduled receivers, whose channel grant decision might be affected by its own link getting scheduled. Using full power makes the grant decision available to maximum number of receivers, which in turn facilitates their decision making. In other embodiments, the bandwidth grant message is sent at some power level greater than link optimized power.

Figure 3:
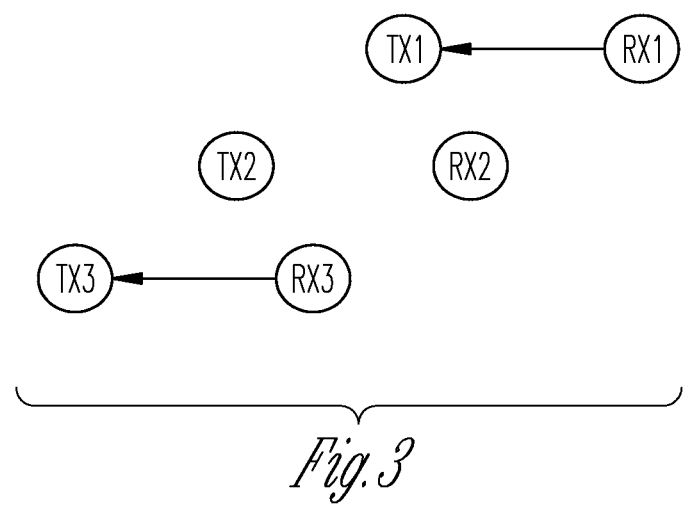
FIG. 3 illustrates an improved technique for receiver yielding in accordance with some embodiments.

An embodiment of the scheme with improved receiver yielding as just described is illustrated by FIG. 3 which shows three D2D transmitters Tx1 through Tx3 and three D2D receivers Rx1 through Rx3. The D2D pairs Tx1-Rx1, Tx2-Rx2, Tx3-Rx3 communicate via D2D links 1 through 3, respectively. Transmitters Tx1 and Tx3 transmit transmission requests, but Tx3 does not. Accordingly, Rx1 transmits a bandwidth grant message, but Rx2 does not. Since Rx3 does not hear a bandwidth grant message from Rx2, it assumes that Rx2 yielded and sends a bandwidth grant to its transmitter Tx3. Note that, since the bandwidth grant is done at full power, with a high probability, Rx3 should be able to decode the bandwidth grant message of Rx2. Thus, if Rx2 is not yielding, with a high probability, Rx3 knows about this decision and decides whether to yield or not based on the SIR constraint. However, it is still possible that Rx2 sends a grant message which is not correctly decoded at Rx3. In that case a low rate link 3 is also scheduled. Note that this event would generally occur with low probability. Furthermore, in that case, link 3 and link 2 are likely to be far apart because Rx3 cannot decode Rx2 and the D2D link between Tx2 and Rx2 is usually short. Therefore, it is possible for both link 2 and link 3 to run in parallel without causing too much interference to each other.

Figure 4:
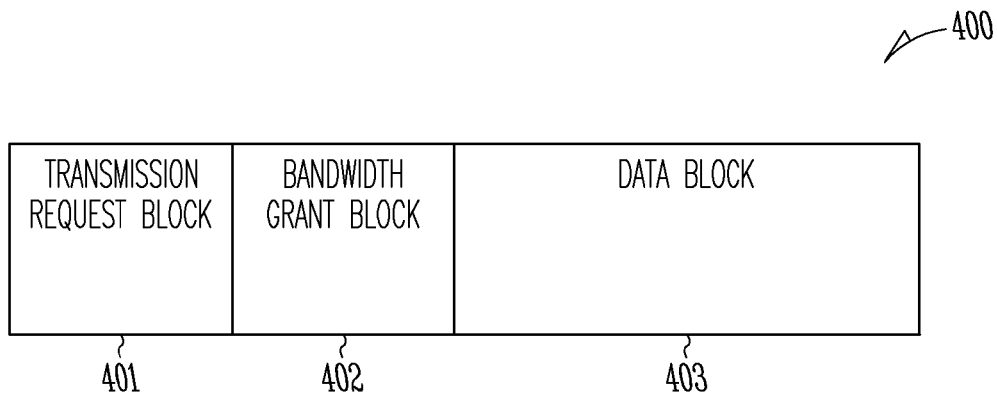
FIG. 4 illustrates an example of a time slot used for D2D communications in accordance with some embodiments.

In one embodiment, D2D terminals communicate over the wireless channel using orthogonal frequency division multiplexing (OFDM), wherein a particular wireless channel resource element corresponds to a particular subcarrier of a particular OFDM symbol. For purposes of D2D communication, the wireless channel is divided into time slots that each comprise a series of OFDM symbols. FIG. 4 shows an example, in accordance with some embodiments, of a time slot 400 that is divided into a transmission request block 401 containing resource elements for transmission requests and a bandwidth grant block 402 containing resource elements for bandwidth grant transmissions. In some embodiments, there may be multiple bandwidth grant blocks 402. A data block 403 whose resource elements are used for data transmission between scheduled Tx UEs and Rx UEs follows the blocks 401 and 402. Additional blocks may also be included such as for rate-adaptation among the granted links using pilot signals. The resource elements of the bandwidth grant block assigned to particular Tx-Rx pairs are arranged such that the resource element of a higher priority Tx-Rx pair occurs before the resource element of a lower priority Tx-Rx pair. In this way, an Rx device may determine whether higher priority Rx devices have transmitted bandwidth grant messages before deciding whether to transmit its own bandwidth grant message.

Figure 5:
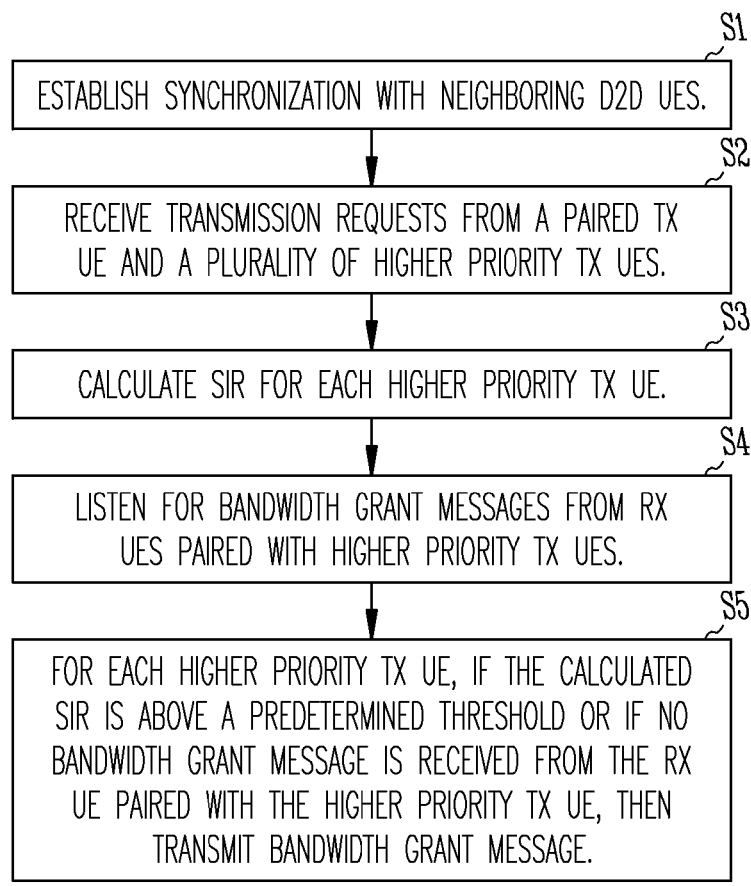
FIG. 5 illustrates an algorithm performed by a UE for D2D communications accordance with some embodiments.

FIG. 5 illustrates an example algorithm performed by a UE for D2D communications according to some embodiments. At stage S1, the UE establishes synchronization with a plurality of neighboring UEs configured for device-to-device (D2D) communications over a wireless channel. The synchronized UEs form a group of D2D transmitter-receiver (Tx-Rx) pairs and each Tx-Rx pair is assigned a priority for D2D communication. At stage S2, the UE acting as an Rx UE, receives transmission requests from a paired Tx UE and a plurality of higher priority Tx UEs in designated wireless channel resource elements according to the assigned priority of the Tx-Rx pairs. At stage S3, the UE measures the power of the transmission request from the paired Tx relative to the transmission requests of the higher priority Tx UEs to and, for each such higher priority Tx UE, calculates a signal-to-interference ratio (SIR) to determine if the SIR would be above a predetermined threshold if the higher priority Tx UE is transmitting. At state S4, the UE listens for any bandwidth grant messages transmitted by the Rx UEs paired with the higher priority Tx UEs. At stage S5, the UE transmits a bandwidth grant message in a designated wireless channel resource element to schedule reception of data from the paired Tx UE if, for each such higher priority Tx UE from which a transmission request is received, the calculated SIR is above a predetermined threshold or no bandwidth grant message is received from the Rx UE paired with the higher priority Tx UE.

Example Embodiments

In Example 1, a method for operating a user equipment (UE) device, comprises: establishing synchronization with a plurality of neighboring UEs configured for device-to-device (D2D) communications over a wireless channel, wherein the synchronized UEs form a group of D2D transmitter-receiver (Tx-Rx) pairs and wherein each Tx-Rx pair is assigned a priority for D2D communication; when acting as an Rx UE, receiving transmission requests from a paired Tx UE and a higher priority Tx UE in designated wireless channel resource elements according to the assigned priority of the Tx-Rx pairs; measuring the power of the transmission request from the paired Tx relative to the transmission requests of the higher priority Tx UE to and calculating a signal-to-interference ratio (SIR) to determine if the SIR would be above a predetermined threshold if the higher priority Tx UE is transmitting; and, transmitting a bandwidth grant message in a designated wireless channel resource element to schedule reception of data from the paired Tx UE if the calculated SIR is above the predetermined threshold or if no bandwidth grant message is received from the Rx UE paired with the higher priority Tx UE.

In Example 2, the subject matter of Example 1 may optionally include transmitting the bandwidth grant message at a power level higher than a power level optimized for the link with the paired Tx UE.

In Example 3, the subject matter of Example 1 may optionally include transmitting the bandwidth grant message at full power.

In Example 4, the subject matter of Example 1 may optionally include receiving transmission requests from a plurality of higher priority Tx UEs in designated wireless channel resource elements according to the assigned priority of the Tx-Rx pairs; and, transmitting a bandwidth grant message in a designated wireless channel resource element to schedule reception of data from the paired Tx UE if, for each such higher priority Tx UE from which a transmission request is received, the calculated SIR is above a predetermined threshold or no bandwidth grant message is received from the Rx UE paired with the higher priority Tx UE.

In Example 5, the subject matter of Example 1 may optionally include communicating over the wireless channel using orthogonal frequency division multiplexing (OFDM), wherein a particular wireless channel resource element corresponds to a particular subcarrier of a particular OFDM symbol.

In Example 6, the subject matter of Example 5 may optionally include wherein the wireless channel is divided into time slots that each comprise a series of OFDM symbols, wherein a time slot is divided into a transmission request block containing resource elements for transmission requests and a bandwidth grant block containing resource elements for bandwidth grant transmissions.

In Example 7, the subject matter of Example 6 may optionally include wherein a time slot further includes, following the transmission request and bandwidth grant blocks, a data block whose resource elements are used for data transmission between scheduled Tx UEs and Rx UEs.

In Example 8, the subject matter of Example 6 may optionally include wherein the resource elements of the bandwidth grant block assigned to particular Tx-Rx pairs are arranged such that the resource element of a higher priority Tx-Rx pair occurs before the resource element of a lower priority Tx-Rx pair.

In Example 9, the subject matters of any of Examples 1 through 8 may optionally include establishing synchronization with the plurality of neighboring UEs by synchronizing with an evolved Node B (eNB).

In Example 10, the subject matters of any of Examples 1 through 8 may optionally include establishing synchronization with the plurality of neighboring UEs by synchronizing with a global positioning system (GPS).

In Example 11, a computer-readable medium contains instructions for performing the methods recited by any of Examples 1 through 10.

In Example 12, a user equipment (UE) device, comprises: a radio transceiver to provide for D2D (device-to-device) communications over a wireless channel; and processing circuitry connected to the radio transceiver to perform the methods recited in any of Examples 1 through 10.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The embodiments as described above may be implemented in various hardware configurations that may include a processor for executing instructions that perform the techniques described. Such instructions may be contained in a machine-readable medium such as a suitable storage medium or a memory or other processor-executable medium.

The embodiments as described herein may be implemented in a number of environments such as part of a wireless local area network (WLAN), 3rd Generation Partnership Project (3GPP) Universal Terrestrial Radio Access Network (UTRAN), or Long-Term-Evolution (LTE) or a Long-Term-Evolution (LTE) communication system, although the scope of the invention is not limited in this respect. An example LTE system includes a number of mobile stations, defined by the LTE specification as User Equipment (UE), communicating with a base station, defined by the LTE specifications as an eNodeB.

Antennas referred to herein may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to take advantage of spatial diversity and the different channel characteristics that may result between each of antennas and the antennas of a transmitting station. In some MIMO embodiments, antennas may be separated by up to 1/10 of a wavelength or more.

In some embodiments, the receiver may be configured to receive signals in accordance with the Universal Terrestrial Radio Access Network (UTRAN) LTE communication standards. For more information with respect to UTRAN LTE standards, see the 3rd Generation Partnership Project (3GPP) standards for UTRAN-LTE, release 12, including variations and evolutions thereof.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A method for operating a user equipment (UE) device, comprising:
    establishing synchronization with a plurality of neighboring UEs configured for device-to-device (D2D) communications over a wireless channel, wherein the synchronized UEs form a group of D2D transmitter-receiver (Tx-Rx) pairs and wherein each Tx-Rx pair is assigned a priority for D2D communication;
    when acting as an Rx UE, receiving transmission requests from a paired Tx UE and a higher priority Tx UE in designated wireless channel resource elements according to the assigned priority of the Tx-Rx pairs;
    measuring the power of the transmission request from the paired Tx relative to the transmission requests of the higher priority Tx UE;
    calculating a signal-to-interference ratio (SIR) to determine if the SIR would be above a predetermined threshold if the higher priority Tx UE is transmitting; and,
    transmitting a bandwidth grant message in a designated wireless channel resource element to schedule reception of data from the paired Tx UE if the calculated SIR is above the predetermined threshold or if no bandwidth grant message is received from the Rx UE paired with the higher priority Tx UE, wherein the bandwidth grant message is transmitted at full power.

2. The method of claim 1 further comprising:
    receiving transmission requests from a plurality of higher priority Tx UEs in designated wireless channel resource elements according to the assigned priority of the Tx-Rx pairs; and,
    transmitting a bandwidth grant message in a designated wireless channel resource element to schedule reception of data from the paired Tx UE if, for each such higher priority Tx UE from which a transmission request is received, the calculated SIR is above a predetermined threshold or no bandwidth grant message is received from the Rx UE paired with the higher priority Tx UE.

3. The method of claim 1 further comprising communicating over the wireless channel using orthogonal frequency division multiplexing (OFDM), wherein a particular wireless channel resource element corresponds to a particular subcarrier of a particular OFDM symbol.

4. The method of claim 3 wherein the wireless channel is divided into time slots that each comprise a series of OFDM symbols, wherein a time slot is divided into a transmission request block containing resource elements for transmission requests and a bandwidth grant block containing resource elements for bandwidth grant transmissions.

5. The method of claim 4 wherein a time slot further includes, following the transmission request and bandwidth grant blocks, a data block whose resource elements are used for data transmission between scheduled Tx UEs and Rx UEs.

6. The method of claim 4 wherein the resource elements of the bandwidth grant block assigned to particular Tx-Rx pairs are arranged such that the resource element of a higher priority Tx-Rx pair occurs before the resource element of a lower priority Tx-Rx pair.

7. The method of claim 1 further comprising establishing synchronization with the plurality of neighboring UEs by synchronizing with an evolved Node B (eNB).

8. The method of claim 1 further comprising establishing synchronization with the plurality of neighboring UEs by synchronizing with a global positioning system (GPS).

9. A user equipment (UE) device, comprising:
    a radio transceiver to provide for D2D (device-to-device) communications over a wireless channel; and
    processing circuitry connected to the radio transceiver to:
        establish synchronization with a plurality of neighboring D2D UEs, wherein the synchronized UEs form a group of D2D transmitter-receiver (Tx-Rx) pairs and wherein each Tx-Rx pair is assigned a priority for D2D communication;
        when acting as an Rx UE, receive transmission requests from a paired Tx UE and a higher priority Tx UE in designated wireless channel resource elements according to the assigned priority of the Tx-Rx pairs;
        measure the power of the transmission request from the paired Tx relative to the transmission requests of the higher priority Tx UE; and,
        calculate a signal-to-interference ratio (SIR) to determine if the SIR would be above a predetermined threshold if the higher priority Tx UE is transmitting; transmit a bandwidth grant message in a designated wireless channel resource element to schedule reception of data from the paired Tx UE if the calculated SIR is above the predetermined threshold or if no bandwidth grant message is received from the Rx UE paired with the higher priority Tx UE, wherein the bandwidth grant message is transmitted at full power.

10. The UE of claim 9 wherein the processing circuitry is further to:
    receive transmission requests from a plurality of higher priority Tx UEs in designated wireless channel resource elements according to the assigned priority of the Tx-Rx pairs;
    transmit a bandwidth grant message in a designated wireless channel resource element to schedule reception of data from the paired Tx UE if, for each such higher priority Tx UE from which a transmission request is received, the calculated SIR is above a predetermined threshold or no bandwidth grant message is received from the Rx UE paired with the higher priority Tx UE.

11. The UE of claim 9 wherein the radio transceiver is to communicate over the wireless channel using orthogonal frequency division multiplexing (OFDM), wherein a particular wireless channel resource element corresponds to a particular subcarrier of a particular OFDM symbol.

12. The UE of claim 11 wherein the radio transceiver is to communicate over the wireless channel in time slots that each comprise a series of OFDM symbols, wherein a time slot is divided into a transmission request block containing resource elements for transmission requests and a bandwidth grant block containing resource elements for bandwidth grant transmissions.

13. The UE of claim 12 wherein a time slot further includes, following the transmission request and bandwidth grant blocks, a data block whose resource elements are used for data transmission between scheduled Tx UEs and Rx UEs.

14. The UE of claim 12 wherein the resource elements of the bandwidth grant block assigned to particular Tx-Rx pairs are arranged such that the resource element of a higher priority Tx-Rx pair occurs before the resource element of a lower priority Tx-Rx pair.

15. A non-transitory computer-readable storage medium that stores instructions for execution by one or more processors of a user equipment to perform operations to configure the UE to:
  establish synchronization with a plurality of neighboring UEs configured for device-to-device (D2D) communications over a wireless channel, wherein the synchronized UEs form a group of D2D transmitter-receiver (Tx-Rx) pairs and wherein each Tx-Rx pair is assigned a priority for D2D communication;
  when acting as an Rx UE, receive transmission requests from a paired Tx UE and a higher priority Tx UE in designated wireless channel resource elements according to the assigned priority of the Tx-Rx pairs;
  measure the power of the transmission request from the paired Tx relative to the transmission requests of the higher priority Tx UE;
  calculate a signal-to-interference ratio (SIR) to determine if the SIR would be above a predetermined threshold if the higher priority Tx UE is transmitting;
  transmit a bandwidth grant message in a designated wireless channel resource element to schedule reception of data from the paired Tx UE if the calculated SIR is above the predetermined threshold or if no bandwidth grant message is received from the Rx UE paired with the higher priority Tx UE, wherein the bandwidth grant message is transmitted at full bower.

16. The computer-readable storage medium of claim 15 that further stores instructions or execution by one or more processors of a user equipment to perform operations to configure the UE to:
  receive transmission requests from a plurality of higher priority Tx UEs in designated wireless channel resource elements according to the assigned priority of the Tx-Rx pairs; and,
  transmit a bandwidth grant message in a designated wireless channel resource element to schedule reception of data from the paired Tx UE if, for each such higher priority Tx UE from which a transmission request is received, the calculated SIR is above a predetermined threshold or no bandwidth grant message is received from the Rx UE paired with the higher priority Tx UE.

* * * * *